(12) United States Patent
Johnson

(10) Patent No.: US 7,065,956 B2
(45) Date of Patent: Jun. 27, 2006

(54) TWO PIECE JET ENGINE IGNITER ASSEMBLY

(76) Inventor: Howard Johnson, 1591 E. El Segundo Blvd., El Segundo, CA (US) 90245

(*) Notice: Subject to any disclaimer, the term of this patent is extended or adjusted under 35 U.S.C. 154(b) by 0 days.

(21) Appl. No.: 10/935,781

(22) Filed: Sep. 8, 2004

(65) Prior Publication Data

US 2006/0059885 A1    Mar. 23, 2006

(51) Int. Cl.
*F02C 7/264* (2006.01)

(52) U.S. Cl. .................... 60/39.821; 431/258

(58) Field of Classification Search ......... 123/146.5 R, 123/169 R, 169 EC, 169 EL, 169 EB; 361/253; 431/258, 264; 313/11.5, 118, 135, 122, 141, 313/144; 60/39.821, 39.827
See application file for complete search history.

(56) References Cited

U.S. PATENT DOCUMENTS

| | | | |
|---|---|---|---|
| 1,996,422 A | | 4/1935 | Hurley |
| 2,109,029 A | * | 3/1938 | Nowosielski .............. 174/15.3 |
| 2,286,233 A | | 8/1942 | Scott |
| 2,671,186 A | | 3/1954 | Shoobert |
| 3,050,658 A | | 8/1962 | Lay et al. |
| 3,073,121 A | * | 1/1963 | Baker et al. ............. 60/39.826 |
| 3,330,985 A | | 7/1967 | Johnston |
| 3,750,392 A | * | 8/1973 | Zoll ....................... 60/39.827 |
| 3,896,344 A | | 7/1975 | Haselton |
| 4,035,131 A | * | 7/1977 | Cerkanowicz ................. 431/6 |
| 4,215,979 A | * | 8/1980 | Morishita ................... 431/264 |
| 4,717,986 A | * | 1/1988 | Collins et al. ............. 361/253 |
| 4,926,088 A | * | 5/1990 | Kler ......................... 313/131 A |
| 4,938,019 A | | 7/1990 | Angell et al. |
| 5,083,932 A | * | 1/1992 | Wyatt et al. ................ 439/126 |
| RE34,152 E | * | 12/1992 | Meyer ........................ 313/126 |
| 5,283,499 A | | 2/1994 | Adam et al. |
| 5,367,871 A | | 11/1994 | Venkataramani et al. |
| 5,381,773 A | | 1/1995 | Straub |
| 5,402,637 A | * | 4/1995 | Adam ..................... 60/39.827 |
| 6,311,475 B1 | | 11/2001 | Ngo-Beelman et al. |
| 6,438,940 B1 | | 8/2002 | Vacek et al. |
| 6,483,022 B1 | | 11/2002 | Packard |
| 6,582,220 B1 | | 6/2003 | Heck et al. |
| 6,684,621 B1 | | 2/2004 | Johnson |
| 6,771,009 B1 | * | 8/2004 | Nishikawa et al. .......... 313/118 |

* cited by examiner

*Primary Examiner*—William H. Rodriguez
(74) *Attorney, Agent, or Firm*—David A. Belasco; Belasco Jacobs & Townsley, LLP

(57) ABSTRACT

A two-piece jet engine igniter assembly includes a front section and a rear section. When the igniter assembly is installed in an aircraft, either the front section or the rear section is removable for service or replacement. The front section includes a detachable cooling module. The cooling module includes a cooling tube adapter and a rear ferrule attached at either end of a flexible conduit. The conduit surrounds a thin wall polytetrafluorethalene liner, a braided tube and a cable support. The braided tube is electrically connected to the flexible conduit. Another version of the cooling module, designed for serviceability, includes a cooling tube adapter and a modified rear ferrule attached at either end of a flexible conduit, however a thick wall polytetrafluorethalene liner is removably secured within the flexible conduit by a circular clip sized and shaped to fit through the cylindrical bore of the modified rear ferrule when compressed.

13 Claims, 4 Drawing Sheets

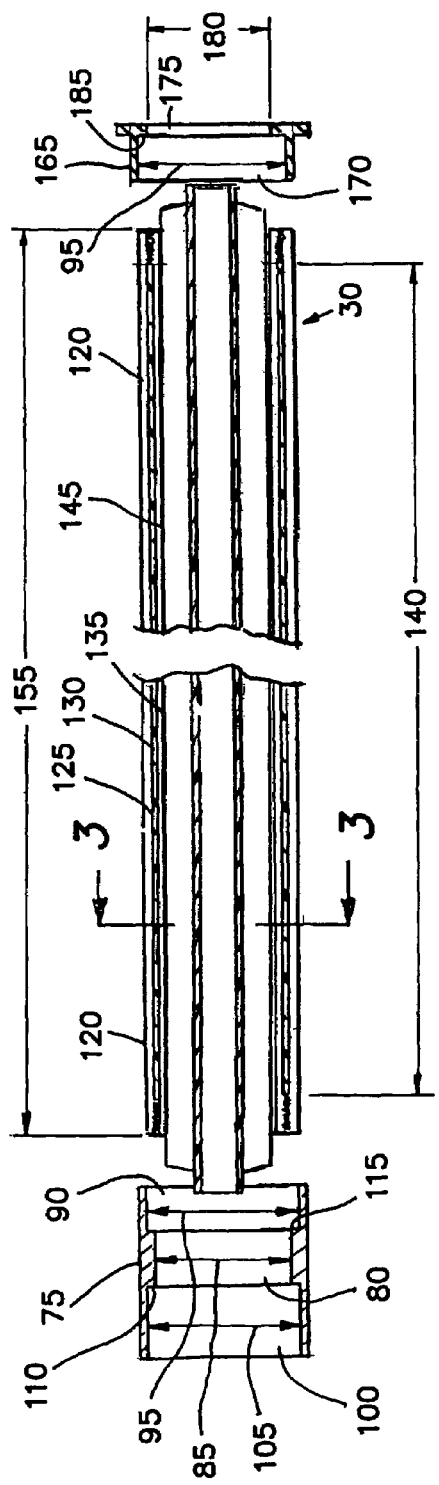
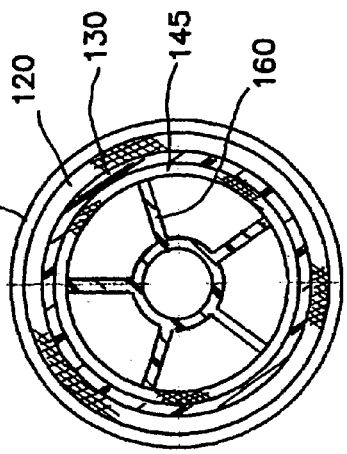
FIG. 2
FIG. 3
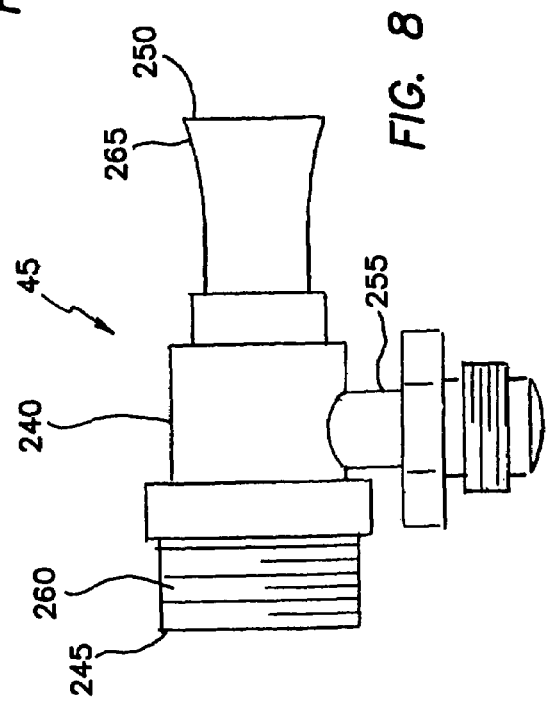
FIG. 8

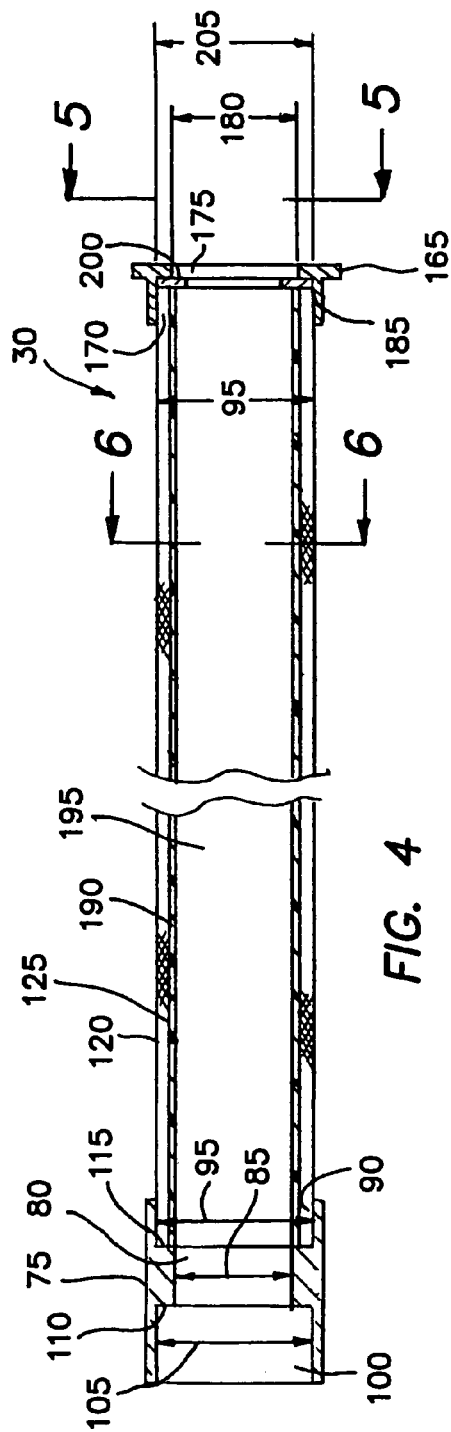
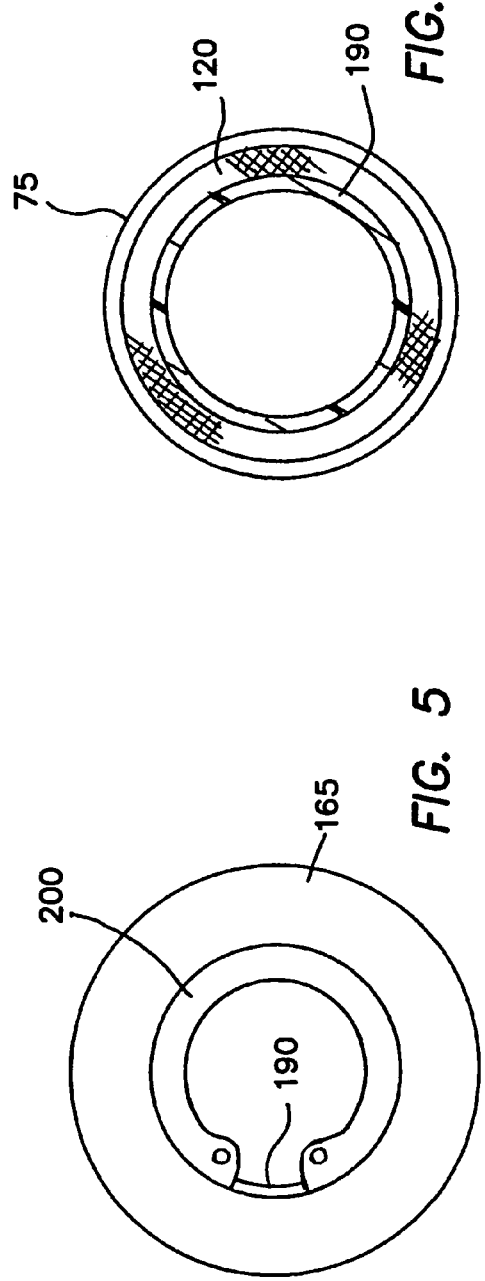

TWO PIECE JET ENGINE IGNITER ASSEMBLY

FIELD OF INVENTION

The invention pertains to high voltage ignition cable connectors. More particularly, the invention relates to easily serviced igniter leads for aircraft jet engines.

BACKGROUND OF THE INVENTION

Various types of high voltage ignition cable connectors and igniter leads have been developed for use in aircraft engines. U.S. Pat. No. 6,483,022, issued to Packard, is directed to methods and an apparatus for ignition lead assembly connections. This system includes a pressurized ignition lead assembly that further includes an ignition cable, a conduit, and a seal sub-assembly. The conduit extends between an ignition lead assembly first end, or non-air-cooled end, and an ignition lead assembly second end, or air-cooled end. The conduit is flexible and includes an air-cooled portion and a non-air-cooled portion. The non-air-cooled portion extends between a first end and a second end adjacent ignition lead assembly connector. The non-air-cooled portion is integrally formed with a coupling assembly at the non-air-cooled first end. The coupling assembly is used to connect the non-air-cooled portion to the air-cooled portion, and includes a coupling nut and a housing. The coupling nut interlocks with a conduit tapered connector sleeve to secure the conduit non-air-cooled portion with the conduit air-cooled portion, such that the tapered connector sleeve is in contact with the coupling assembly housing.

U.S. Pat. No. 6,684,621, issued to Johnson, the present inventor, discloses a jet engine igniter lead elbow assembly includes a hollow saddle adapter with a semi-circular cutout at one end, a master cylinder, an extension tube, a ferrule and a nut extension tube. The master cylinder is hollow, having a perpendicular circular orifice adjacent a closed end. The semi-circular cutout is shaped to fit over the circular orifice. The lower end of the master cylinder attaches to the top end of the extension tube. The bottom end of the extension attaches to the first end of the ferrule. The saddle adapter is attached to the master cylinder at the semi-circular cutout, the extension tube is then attached to the lower end of the master cylinder. The nut extension tube is slipped over the extension tube and the ferrule is then attached. The preferred method of attachment is silver soldering as it permits removal and replacement of the component parts without damage.

U.S. Pat. No. 5,367,871, issued to Venkataramani, et al., is directed to a plasma jet igniter is used to reliably relight a jet engine at high altitudes under adverse combustion conditions. The air-fuel mixture from the primary combustion zone of the jet engine combustor may be used as the plasma medium or, alternatively, liquid fuel direct from the aircraft fuel system may be used as a fuel charge.

U.S. Pat. No. 6,582,220, issued to Heck, et al., discloses An igniter assembly for a fossil fuel-fired power generation system includes an elongate electrode, a tube sub assembly, and a coupling sub assembly, and an insulator sub assembly. The coupling sub assembly cooperates with other structural elements of the igniter assembly and the respective windbox in which the igniter assembly is installed to operably couple the elongate electrode to an external electrical power source. The igniter assembly includes a contact socket secured by crimping to a lead of the external electrical power source which is biased into an electric current communicating disposition with the electrode rod of the igniter assembly.

U.S. Pat. No. 5,283,499, issued to Adam, et al., is directed to An improved igniter and cable connector assembly for turbine engines. An igniter mounting adapter is secured to the engine. The igniter slides into a hole through the adapter and is retained by an enlarged head on the igniter. An annular seal is positioned around a high voltage terminal on the igniter head and a terminal on the cable connector is positioned against the igniter terminal. The cable connector is secured to the adapter, for example, by either a clamp assembly or a coupling nut or a quick release connector. As the cable connector is secured to the adapter, the seal is compressed between the igniter and connector insulators and, optionally, the connector terminal is rotated and pressed against the igniter terminal to establish a reliable electrical contact. The connector and igniter terminals preferably have mating conical or spherical surfaces, one of which may be an annular segment to provide an increased electrical contact area.

It is an objective of the present invention to provide a jet engine igniter assembly that is separable into forward and after ends so that either end may be quickly replaced while the removed end is serviced or repaired. It is a further objective to provide means for easily disassembling the components of the forward and after ends so as to minimize down time for the assembly. It is a still further objective of the invention to use standardized parts wherever possible to secure the components to the assembly. Finally, it is an objective of the present invention to provide an assembly that is rugged, reliable and economical to produce.

While some of the objectives of the present invention are disclosed in the prior art, none of the inventions found include all of the requirements identified.

SUMMARY OF THE INVENTION

The present invention addresses all of the deficiencies of prior art jet engine igniter assembly inventions and satisfies all of the objectives described above.

(1) A two-piece jet engine igniter assembly providing the desired features may be constructed from the following components. A front section is provided. The front section includes a first contact assembly, a first high tension lead, a detachable cooling module, and a connecting nut. A rear section is provided. The rear section includes an adapter assembly, a second high tension lead, a conduit, a firewall adapter, a ferrule and a second contact assembly. The front section is removably connected to the rear section. When the igniter assembly is installed in an aircraft, either the front section or the rear section is removable for service or replacement.

(2) In a variant of the invention, the detachable cooling module includes a cooling tube adapter. The cooling tube adapter has a first cylindrical bore of a first predetermined diameter, a collinear, first inner counterbore of a second predetermined diameter, larger than the first predetermined diameter and a collinear first outer counterbore of a third predetermined diameter, larger than the first predetermined diameter. The inner and outer counterbores form first and second shoulders with the first cylindrical bore. A flexible conduit is provided. The flexible conduit has a hollow central bore and is sized and shaped to fit frictionally within the first inner counterbore of the cooling tube adapter. A thin wall polytetrafluorethalene liner is provided. The thin wall polytetrafluorethalene liner has a hollow central bore and is sized and shaped to fit slidably within the flexible conduit and has a length less than that of the flexible conduit.

A braided tube is provided. The braided tube has a hollow central bore and is sized and shaped to fit slidably within the thin wall polytetrafluorethalene liner. The braided tube has a length greater than the thin wall polytetrafluorethalene liner and is electrically connected to the flexible conduit. A cable support is provided. The cable support is sized and shaped to fit slidably within the braided tube. A rear ferrule is provided. The rear ferrule has a second cylindrical bore of the second predetermined diameter, a collinear, second outer counterbore of a fourth predetermined diameter, smaller than the second predetermined diameter, the second outer counterbore forming a third shoulder with the second cylindrical bore. The second cylindrical bore of the rear ferrule is sized and shaped to fit frictionally over the flexible conduit. When the flexible conduit is inserted into the cooling tube adapter and the rear ferrule, it will abut the second and third shoulders, respectively.

(3) In another variant, the detachable cooling module includes a cooling tube adapter. The cooling tube adapter has a first cylindrical bore of a first predetermined diameter, a collinear, first inner counterbore of a second predetermined diameter, larger than the first predetermined diameter, a collinear first outer counterbore of a third predetermined diameter, larger than the first predetermined diameter. The inner and outer counterbores form first and second shoulders with the first cylindrical bore. A flexible conduit is provided. The flexible conduit has a hollow central bore and is sized and shaped to fit frictionally within the first inner counterbore of the cooling tube adapter. A heavy wall polytetrafluorethalene liner is provided. The heavy wall polytetrafluorethalene liner has a hollow central bore and is sized and shaped to fit slidably within the flexible conduit.

A rear ferrule is provided. The rear ferrule has a second cylindrical bore of the second predetermined diameter, a collinear, second outer counterbore of a fourth predetermined diameter, smaller than the second predetermined diameter. The second outer counterbore forms a third shoulder with the second cylindrical bore. The second cylindrical bore of the rear ferrule is sized and shaped to fit frictionally over the flexible conduit. A circular clip is provided. The circular clip is sized and shaped to fit through the second outer counterbore when compressed and to have a diameter larger than the fourth predetermined diameter when released. When the heavy wall polytetrafluoroethalene liner is inserted into the flexible conduit and the circular clip is compressed and passed through the second outer counterbore, the circular clip will removably secure the heavy wall polytetrafluorethalene liner within the flexible conduit.

(4) (5) In still another variant, the front section includes a front elbow. The front elbow has a hollow bore, a first end, a second end and is attached at the second end to the cooling tube adapter adjacent the first outer counterbore.

(6) In yet another variant, the cooling tube adapter includes a first flare adjacent the first inner counterbore. The first flare provides strain relief for the flexible conduit.

(7) In a further variant, the rear ferrule further comprises a second flare adjacent the second cylindrical bore. The second flare provides strain relief for the flexible conduit.

(8) In still a further variant, the thin wall polytetrafluorethalene liner ranges from 0.016 inches to 0.024 inches in thickness.

(9) In another variant of the invention, the heavy wall polytetrafluorethalene liner ranges from 0.024 inches to 0.036 inches in thickness.

(10) In still another variant, the adapter assembly includes a hollow body. The hollow body has a first end, a second end, and a connecting tube. The first end has an external thread. The thread is sized and shaped to attached threadedly to the connecting nut. The second end is a tube terminating in a third flare. The third flare provides strain relief for the conduit. The connecting tube is attached orthogonally to the hollow body between the first end and the second end.

(11) In a further variant, the firewall adapter includes a seal sleeve, has a hollow bore, a forward end and a rearward end and is sized and shaped to fit slidably over the conduit. A seal adapter is provided. The seal adapter has a hollow bore sized and shaped to fit slidably over the seal sleeve, a recessed cavity on a forward end and fittings for attachment to a firewall on a rearward end. A flame retardant seal is provided. The flame retardant seal has a hollow bore sized and shaped to fit slidably over the seal sleeve and an outer diameter sized to fit within the recessed cavity in the adapter assembly. A seal retainer is provided. The seal retainer has a hollow bore sized and shaped to fit frictionally over the seal sleeve, thereby retaining the flame retardant seal within the recessed cavity. The seal adapter, the flame retardant seal and the seal retainer are assembled onto the seal sleeve. The seal sleeve has a first flare at the forward end and a second flare at the rearward end. The seal sleeve has a brazing hole adjacent the forward end for attachment to the conduit.

(12) In still a further variant, the ferrule includes a forward end, a rearward end and a hollow bore, the hollow bore is sized and shaped to fit slidably about the conduit. The forward end has a flare and the rearward end has a retaining lip.

(13) In a final variant, the conduit is sized to extend from the adapter assembly to the second contact assembly.

An appreciation of the other aims and objectives of the present invention and an understanding of it may be achieved by referring to the accompanying drawings and the detailed description of a preferred embodiment.

DESCRIPTION OF THE DRAWINGS

FIG. 2 is an exploded cross-sectional side elevational view of the first style detachable cooling module of the FIG. 1 embodiment;

FIG. 3 is a cross-sectional view of the detachable cooling module of the FIG. 1 embodiment taken along the line 3—3;

FIG. 4 is an exploded cross-sectional side elevational view of a second style detachable cooling module;

FIG. 5 is an end view of the rear ferrule of the FIG. 4 detachable cooling module and circular clip;

FIG. 6 is a cross-sectional view of the detachable cooling module of the FIG. 4 embodiment taken along the line 6—6;

FIG. 8 is side elevational view of the adapter assembly illustrating the orthogonal connecting tube;

DETAILED DESCRIPTION OF THE PREFERRED EMBODIMENT (1) FIG. 1 illustrates a two-piece jet engine igniter assembly 10 providing the desired features that may be constructed from the following components. A front section 15 is provided. The front section 15 includes a first contact assembly 20, a first high tension lead 25, a detachable cooling module 30, and a connecting nut 35. A rear section 40 is provided. The rear section 40 includes an adapter assembly 45, a second high tension lead 50, a conduit 55, a firewall adapter 60, a ferrule 65 and a second contact assembly 70. The front section 15 is removably connected to the rear section 40. When the igniter assembly 10 is installed in an aircraft, either the front section 15 or the rear section 40 is removable for service or replacement.

Figure 1:
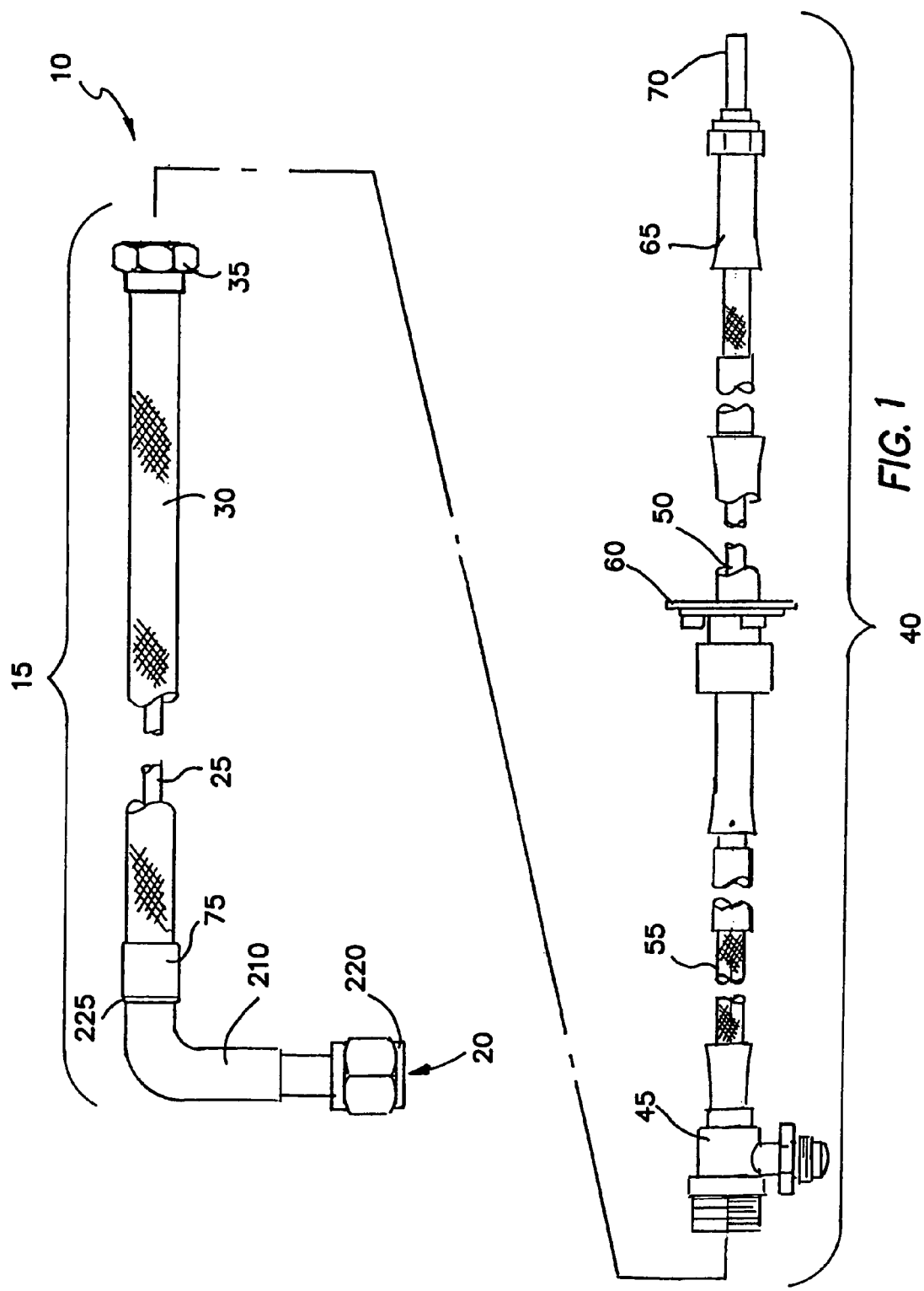
FIG. 1 is a side elevational view of the preferred embodiment of the invention illustrating a first style of detachable cooling module.

(2) In a variant of the invention, as illustrated in FIGS. 2 and 3, the detachable cooling module 30 includes a cooling tube adapter 75. The cooling tube adapter 75 has a first cylindrical bore 80 of a first predetermined diameter 85, a collinear, first inner counterbore 90 of a second predetermined diameter 95, larger than the first predetermined diameter 85 and a collinear first outer counterbore 100 of a third predetermined diameter 105, larger than the first predetermined diameter 85. The inner 90 and outer 100 counterbores form first 110 and second 115 shoulders with the first cylindrical bore 80. A flexible conduit 120 is provided. The flexible conduit 120 has a hollow central bore 125 and is sized and shaped to fit frictionally within the first inner counterbore 90 of the cooling tube adapter 75. A thin wall polytetrafluorethalene liner 130 is provided. The thin wall polytetrafluorethalene liner 130 has a hollow central bore 135 and is sized and shaped to fit slidably within the flexible conduit 120 and has a length 140 less than that of the flexible conduit 120.

A braided tube 145 is provided. The braided tube 145 has a hollow central bore 150 and is sized and shaped to fit slidably within the thin wall polytetrafluorethalene liner 130. The braided tube 145 has a length 155 greater than the thin wall polytetrafluorethalene liner 130 and is electrically connected to the flexible conduit 120. A cable support 160 is provided. The cable support 160 is sized and shaped to fit slidably within the braided tube 145. A rear ferrule 165 is provided. The rear ferrule 165 has a second cylindrical bore 170 of the second predetermined diameter 95, a collinear, second outer counterbore 175 of a fourth predetermined diameter 180, smaller than the second predetermined diameter 95, the second outer counterbore 175 forming a third shoulder 185 with the second cylindrical bore 170. The second cylindrical bore 170 of the rear ferrule 165 is sized and shaped to fit frictionally over the flexible conduit 120. When the flexible conduit 120 is inserted into the cooling tube adapter 75 and the rear ferrule 165, it will abut the second 115 and third 185 shoulders, respectively.

(3) In another variant, as illustrated in FIGS. 4–6, the detachable cooling module 30 includes a cooling tube adapter 75. The cooling tube adapter 75 has a first cylindrical bore 80 of a first predetermined diameter 85, a collinear, first inner counterbore 90 of a second predetermined diameter 95, larger than the first predetermined diameter 85, a collinear first outer counterbore 100 of a third predetermined diameter 105, larger than the first predetermined diameter 85. The inner 90 and outer 100 counterbores form first 110 and second 115 shoulders with the first cylindrical bore 80. A flexible conduit 120 is provided. The flexible conduit 120 has a hollow central bore 125 and is sized and shaped to fit frictionally within the first inner counterbore 90 of the cooling tube adapter 75. A heavy wall polytetrafluorethalene liner 190 is provided. The heavy wall polytetrafluorethalene liner 190 has a hollow central bore 195 and is sized and shaped to fit slidably within the flexible conduit 120.

A rear ferrule 165 is provided. The rear ferrule 165 has a second cylindrical bore 170 of the second predetermined diameter 95, a collinear, second outer counterbore 175 of a fourth predetermined diameter 180, smaller than the second predetermined diameter 95. The second outer counterbore 175 forms a third shoulder 185 with the second cylindrical bore 170. The second cylindrical bore 170 of the rear ferrule 165 is sized and shaped to fit frictionally over the flexible conduit 120. A circular clip 200 is provided. The circular clip 200 is sized and shaped to fit through the second outer counterbore 175 when compressed and to have a diameter 205 larger than the fourth predetermined diameter 180 when released. When the heavy wall polytetrafluorethalene liner 190 is inserted into the flexible conduit 120 and the circular clip 200 is compressed and passed through the second outer counterbore 175, the circular clip 200 will removably secure the heavy wall polytetrafluorethalene liner 190 within the flexible conduit 120.

(4) (5) In still another variant, as illustrated in FIG. 1, the front section 15 includes a front elbow 210. The front elbow 210 has a hollow bore (not shown), a first end 220, a second end 225 and is attached at the second end 225 to the cooling tube adapter 75 adjacent the first outer counterbore 100.

Figure 7:
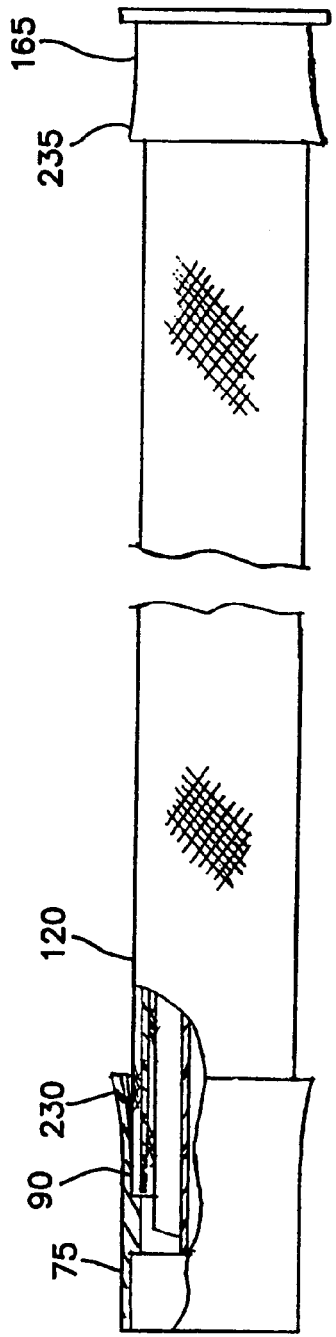
FIG. 7 is a side elevational view of the FIG. 1 detachable cooling module illustrating flared inner ends of the cooling tube adapter and rear ferrule.

(6) In yet another variant, as illustrated in FIG. 7, the cooling tube adapter 75 includes a first flare 230 adjacent the first inner counterbore 90. The first flare 230 provides strain relief for the flexible conduit 120.

(7) In a further variant, as illustrated in FIG. 7, the rear ferrule 165 further comprises a second flare 235 adjacent the second cylindrical bore 170. The second flare 235 provides strain relief for the flexible conduit 120.

(8) In still a further variant, as illustrated in FIGS. 2 and 3, the thin wall polytetrafluorethalene liner 130 ranges from 0.016 inches to 0.024 inches in thickness.

(9) In another variant of the invention, as illustrated in FIGS. 4 and 6, the heavy wall polytetrafluorethalene liner 190 ranges from 0.024 inches to 0.036 inches in thickness.

(10) In still another variant, as illustrated in FIGS. 1 and 8, the adapter assembly 45 includes a hollow body 240. The hollow body 240 has a first end 245, a second end 250, and a connecting tube 255. The first end 245 has an external thread 260. The thread 260 is sized and shaped to attached threadedly to the connecting nut 35. The second end 250 is a tube terminating in a third flare 265. The third flare 265 provides strain relief for the conduit 120. The connecting tube 255 is attached orthogonally to the hollow body 240 between the first end 245 and the second end 250.

Figure 9:
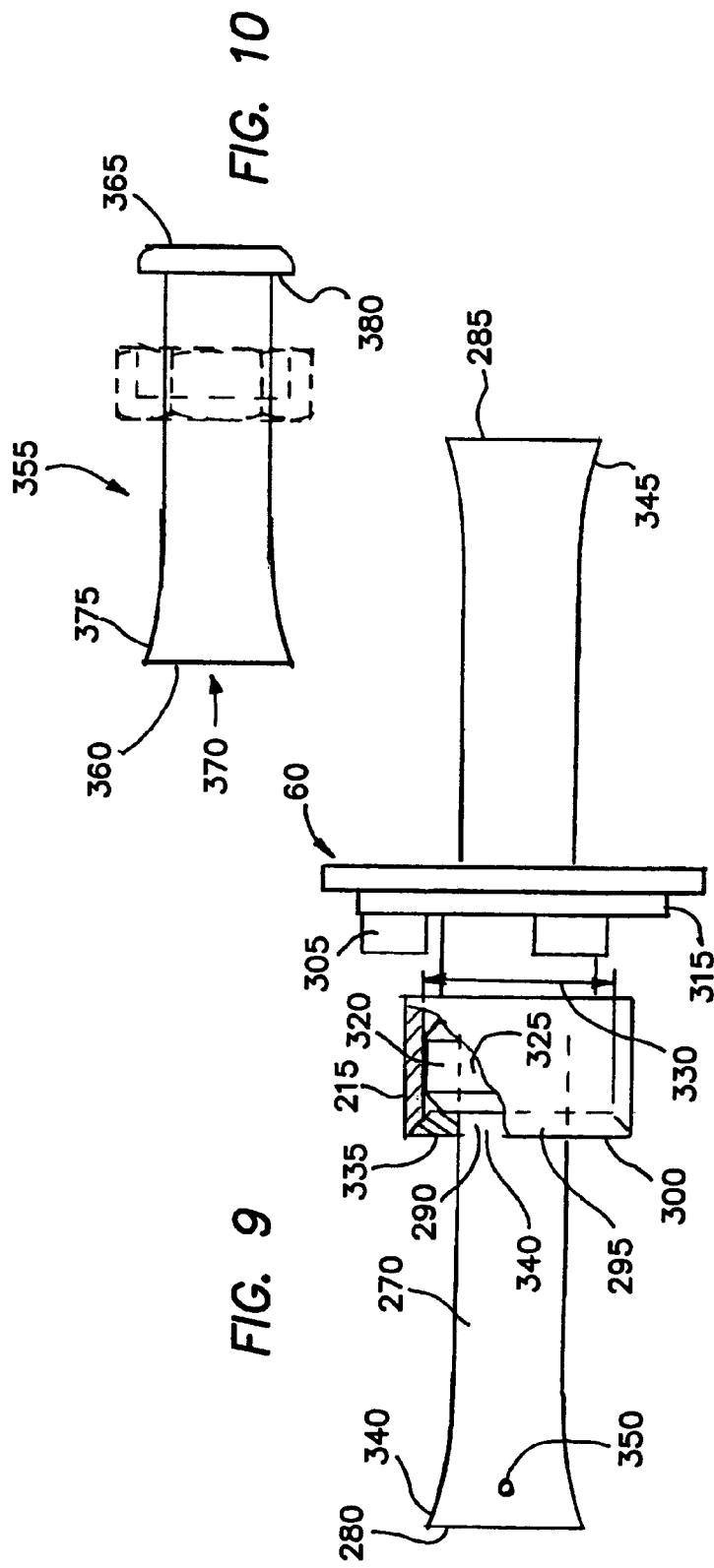
FIG. 9 is side elevational view of the firewall adapter.

(11) In a further variant, as illustrated in FIGS. 1 and 9, the firewall adapter 60 includes a seal sleeve 270, has a hollow bore (not shown), a forward end 280 and a rearward end 285 and is sized and shaped to fit slidably over the conduit 120. A seal adapter 215 is provided. The seal adapter 215 has a hollow bore 290 sized and shaped to fit slidably over the seal sleeve 270, a recessed cavity 295 on a forward end 300 and fittings 305 for attachment to a firewall (not shown) on a rearward end 315. A flame retardant seal 320 is provided. The flame retardant seal 320 has a hollow bore 325 sized and shaped to fit slidably over the seal sleeve 270 and an outer diameter 330 sized to fit within the recessed cavity 295 in the seal adapter 215. A seal retainer 335 is provided. The seal retainer 335 has a hollow bore 340 sized and shaped to fit frictionally over the seal sleeve 270, thereby retaining the flame retardant seal 320 within the recessed cavity 295.

The seal adapter 215, the flame retardant seal 320 and the seal retainer 335 are assembled onto the seal sleeve 270. The seal sleeve 270 has a first flare 340 at the forward end 280 and a second flare 345 at the rearward end 285. The seal sleeve 270 has a brazing hole 350 adjacent the forward end 280 for attachment to the conduit 120.

Figure 10:
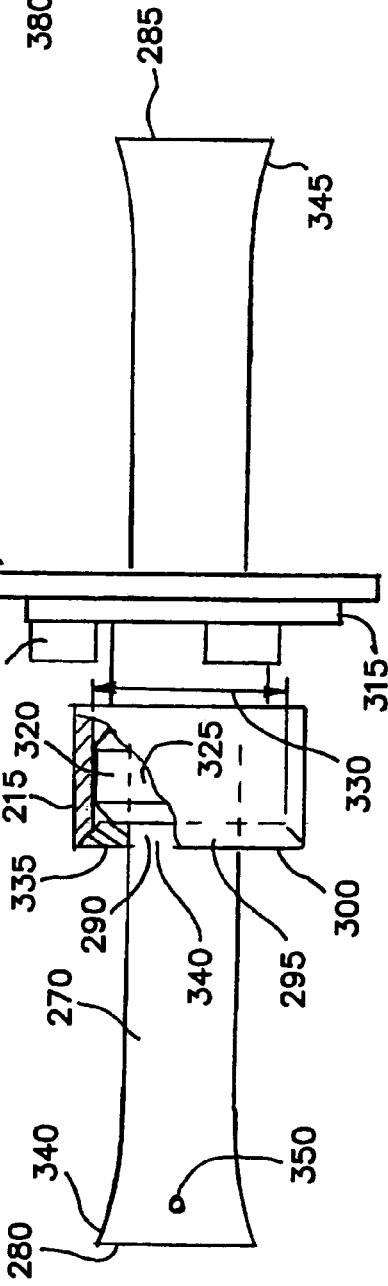
FIG. 10 is side elevational view of the ferrule illustrating the flared end and retaining lip.

(12) In still a further variant, as illustrated in FIG. 10, the ferrule 355 includes a forward end 360, a rearward end 365 and a hollow bore 370, the hollow bore 370 is sized and shaped to fit slidably about the conduit 120. The forward end 360 has a flare 375 and the rearward end 365 has a retaining lip 380.

(13) In a final variant, the conduit 120 is sized to extend from the adapter assembly 45 to the second contact assembly 70.

An appreciation of the other aims and objectives of the present invention and an understanding of it may be achieved by referring to the accompanying drawings and the detailed description of a preferred embodiment.

The two-piece jet engine igniter assembly 10 has been described with reference to particular embodiments. Other modifications and enhancements can be made without departing from the spirit and scope of the claims that follow.

The invention claimed is:

1. A two-piece jet engine igniter assembly, comprising:
   a front section, said front section comprising a first contact assembly, a first high tension lead, a detachable cooling module, and a connecting nut;
   a rear section, said rear section comprising an adapter assembly, a second high tension lead, a conduit, a firewall adapter, a ferrule and a second contact assembly;
   said detachable cooling module comprising a flexible conduit;
   said front section being removably connected to said rear section; and
   said igniter assembly being installed in an aircraft, either of said front section and said rear section is being removable for either of service and replacement.

2. The two-piece jet engine igniter assembly, as described in claim 1, wherein said detachable cooling module further comprises:
   a cooling tube adapter, said cooling tube adapter having a first cylindrical bore of a first predetermined diameter, a collinear, first inner counterbore of a second predetermined diameter, larger than said first predetermined diameter, a collinear first outer counterbore of a third predetermined diameter, larger than said first predetermined diameter, said inner and outer counterbores forming first and second shoulders with said first cylindrical bore;
   said flexible conduit having a hollow central bore and being sized and shaped to fit frictionally within said first inner counterbore of said cooling tube adapter;
   a thin wall polytetrafluorethalene liner, said thin wall polytetrafluorethalene liner having a hollow central bore and being sized and shaped to fit slidably within said flexible conduit and having a length less than that of said flexible conduit;
   a braided tube, said braided tube having a hollow central bore and being sized and shaped to fit slidably within said thin wall polytetrafluorethalene liner, having a length greater than said thin wall polytetrafluorethalene liner and being electrically connected to said flexible conduit;
   a cable support, said cable support and being sized and shaped to fit slidably within said braided tube;
   a rear ferrule, said rear ferrule having a second cylindrical bore of said second predetermined diameter, a collinear, second outer counterbore of a fourth predetermined diameter, smaller than said second predetermined diameter, said second outer counterbore forming a third shoulder with said second cylindrical bore;
   said second cylindrical bore of said rear ferrule being sized and shaped to fit frictionally over said flexible conduit; and
   said flexible conduit is being inserted into said cooling tube adapter and said rear ferrule, such that said flexible conduit abuts said second and third shoulders, respectively.

3. The two-piece jet engine igniter assembly, as described in claim 1, wherein said detachable cooling module further comprises:
   a cooling tube adapter, said cooling tube adapter having a first cylindrical bore of a first predetermined diameter, a collinear, first inner counterbore of a second predetermined diameter, larger than said first predetermined diameter, a collinear first outer counterbore of a third predetermined diameter, larger than said first predetermined diameter, said inner and outer counterbores forming first and second shoulders with said first cylindrical bore;
   said flexible conduit having a hollow central bore and being sized and shaped to fit frictionally within said first inner counterbore of said cooling tube adapter;
   a heavy wall polytetrafluorethalene liner, said heavy wall polytetrafluorethalene liner having a hollow central bore and being sized and shaped to fit slidably within said flexible conduit;
   a rear ferrule, said rear ferrule having a second cylindrical bore of said second predetermined diameter, a collinear, second outer counterbore of a fourth predetermined diameter, smaller than said second predetermined diameter, said second outer counterbore forming a third shoulder with said second cylindrical bore;
   said second cylindrical bore of said rear ferrule being sized and shaped to fit frictionally over said flexible conduit;
   a circular clip, said circular clip being sized and shaped to fit through said second outer counterbore when compressed and to have a diameter larger than said fourth predetermined diameter when released; and
   whereby, when said heavy wall polytetrafluorethalene liner is inserted into said flexible conduit and said circular clip is compressed and passed through said second outer counterbore, said circular clip will removably secure said heavy wall polytetrafluorethalene liner within said flexible conduit.

4. The two-piece jet engine igniter assembly, as described in claim 2, wherein said front section further comprises a front elbow, said front elbow having a hollow bore, a first end, a second end and being attached at said second end to said cooling tube adapter adjacent said first outer counterbore.

5. The two-piece jet engine igniter assembly, as described in claim 3, wherein said front section further comprises a front elbow, said front elbow having a hollow bore, a first end, a second end and being attached at said second end to said cooling tube adapter adjacent said first outer counterbore.

6. The two-piece jet engine igniter assembly, as described in claim 2, wherein said cooling tube adapter further comprises a first flare adjacent said first inner counterbore, said first flare providing strain relief for said flexible conduit.

7. The two-piece jet engine igniter assembly, as described in claim 2, wherein said rear ferrule further comprises a second flare adjacent said second cylindrical bore, said second flare providing strain relief for said flexible conduit.

8. The two-piece jet engine igniter assembly, as described in claim 2, wherein said thin wall polytetrafluorethalene liner ranges from 0.016 inches to 0.024 inches in thickness.

9. The two-piece jet engine igniter assembly, as described in claim 3, wherein said heavy wall polytetrafluorethalene liner ranges from 0.024 inches to 0.036 inches in thickness.

10. The two-piece jet engine igniter assembly, as described in claim 1, wherein said adapter assembly further comprises:
    a hollow body, said hollow body having a first end, a second end, and a connecting tube;
    said first end having an external thread, said thread being sized and shaped to attached threadedly to said connecting nut;
    said second end being a tube terminating in a third flare, said third flare providing strain relief for said conduit; and
    said connecting tube being attached orthogonally to said hollow body between said first end and said second end.

11. The two-piece jet engine igniter assembly, as described in claim 1, wherein said firewall adapter further comprises:
    a seal sleeve, having a hollow bore, a forward end and a rearward end and being sized and shaped to fit slidably over said conduit;
    a seal adapter, said seal adapter having a hollow bore sized and shaped to fit slidably over said seal sleeve, a recessed cavity on a forward end and fittings for attachment to a firewall on a rearward end;
    a flame retardant seal, said flame retardant seal having a hollow bore sized and shaped to fit slidably over said seal sleeve and an outer diameter sized to fit within said recessed cavity in said adapter assembly;
    a seal retainer, said seal retainer having a hollow bore sized and shaped to fit frictionally over said seal sleeve, thereby retaining said flame retardant seal within said recessed cavity;
    said seal adapter, said flame retardant seal and said seal retainer being assembled onto said seal sleeve, said seal sleeve having a first flare at said forward end and a second flare at said rearward end; and
    said seal sleeve having a brazing hole adjacent said forward end for attachment to said conduit.

12. The two-piece jet engine igniter assembly, as described in claim 1, wherein said ferrule further comprises:
    a forward end, a rearward end and a hollow bore, said hollow bore being sized and shaped to fit slidably about said conduit; and
    said forward end having a flare and said rearward end having a retaining lip.

13. The two-piece jet engine igniter assembly, as described in claim 1, wherein said conduit is sized to extend from said adapter assembly to said second contact assembly.

* * * * *